(12) United States Patent
Hyndman

(10) Patent No.: US 7,726,080 B2
(45) Date of Patent: Jun. 1, 2010

(54) UNDER-FLOOR STORAGE

(76) Inventor: Rebecca Lynne Hyndman, 47733 League Ct., Potomac Falls, VA (US) 20165

( * ) Notice: Subject to any disclaimer, the term of this patent is extended or adjusted under 35 U.S.C. 154(b) by 0 days.

(21) Appl. No.: 11/969,871

(22) Filed: Jan. 4, 2008

(65) Prior Publication Data

US 2008/0100080 A1 May 1, 2008

(51) Int. Cl.
E04C 2/52 (2006.01)
(52) U.S. Cl. .................. 52/220.3; 52/220.8; 52/20; 174/480
(58) Field of Classification Search ............... 52/127.5, 52/220.1, 220.8, 220.3, 220.5, 20, 19, 263, 52/506.03, 506.04, 506.06; 248/27.1, 343, 248/344; 174/480, 67, 482, 486, 502
See application file for complete search history.

(56) References Cited

U.S. PATENT DOCUMENTS

| | | | | |
|---|---|---|---|---|
| 3,327,984 A * | 6/1967 | Rennie | ........................ | 248/343 |
| 4,596,095 A * | 6/1986 | Chalfant | ..................... | 52/126.6 |
| 4,721,476 A * | 1/1988 | Zeliff et al. | ................. | 439/142 |
| 4,778,134 A * | 10/1988 | Struthers et al. | ........... | 248/27.1 |
| 5,257,487 A * | 11/1993 | Bantz et al. | ................. | 52/220.1 |
| 5,310,149 A * | 5/1994 | Struthers et al. | ......... | 248/231.9 |
| 5,378,356 A * | 1/1995 | Logsdon | ..................... | 210/163 |
| 5,388,795 A * | 2/1995 | Struthers et al. | ......... | 248/231.9 |
| 5,448,011 A * | 9/1995 | Laughlin | ..................... | 174/480 |
| 5,478,032 A * | 12/1995 | Miller | ........................ | 248/27.1 |
| 5,548,932 A * | 8/1996 | Mead | ......................... | 52/126.6 |
| 6,265,662 B1 * | 7/2001 | Riedy et al. | ................... | 174/67 |
| 6,269,495 B1 * | 8/2001 | Sondrup | ......................... | 4/679 |
| 6,354,048 B1 * | 3/2002 | Gillett et al. | ................ | 52/220.1 |
| 6,755,966 B1 * | 6/2004 | Reed | ........................... | 210/164 |
| 6,848,226 B1 * | 2/2005 | Boyd et al. | ................. | 52/220.8 |
| 6,931,794 B1 * | 8/2005 | Burgess | .......................... | 52/27 |
| 7,173,194 B2 * | 2/2007 | Rupert | ........................ | 174/480 |
| 7,193,152 B2 * | 3/2007 | Moselle | ........................ | 174/50 |

* cited by examiner

Primary Examiner—Richard E Chilcot, Jr.
Assistant Examiner—Chi Q Nguyen

(57) ABSTRACT

An under-floor storage system provides extra storage space, and is intended for use in locations where tile floors are normally used, such as in kitchens and in bathrooms. The storage system provides for tiles that are the lids of sub-floor storage containers. In one embodiment, the removed tile lid provides access to the storage compartment. In another embodiment, the lid and the storage compartment are integral in normal configuration, but can be separated once removed from the floor.

6 Claims, 21 Drawing Sheets

UNDER-FLOOR STORAGE

FIELD OF THE INVENTION

This invention relates to storage.

BACKGROUND OF THE INVENTION

People always need more storage. Bathrooms and kitchens are two places where this need is especially great. In such places, people usually use cupboards and storage cabinets. Another, less intrusive kind of storage is needed to replace or supplement storage using cupboards and cabinets.

SUMMARY OF THE INVENTION

The invention is an under-floor storage system where people store items under the floor in boxes that have floor tiles for lids. The storage is under the floor and easy to access but out of the way. Because the lid is or has a floor tile, the additional storage is not unsightly. The floor tile on the lid is at the same level as other floor tiles in the room. The invention is taught below by way of various specific exemplary embodiments explained in detail, and illustrated in the enclosed drawing figures.

BRIEF DESCRIPTION OF THE DRAWING FIGURES

The drawing figures depict, in simplified form, embodiments reflecting the principles of the invention. Many items and details that will be readily understood by one familiar with this field have been omitted so as to avoid obscuring the invention. In the drawings.

DETAILED DESCRIPTION

The invention will now be taught using various exemplary embodiments. Although the embodiments are described in detail, it will be appreciated that the invention is not limited to just these embodiments, and so the appended claims should be consulted to determine the true scope of the invention.

Figure 1:
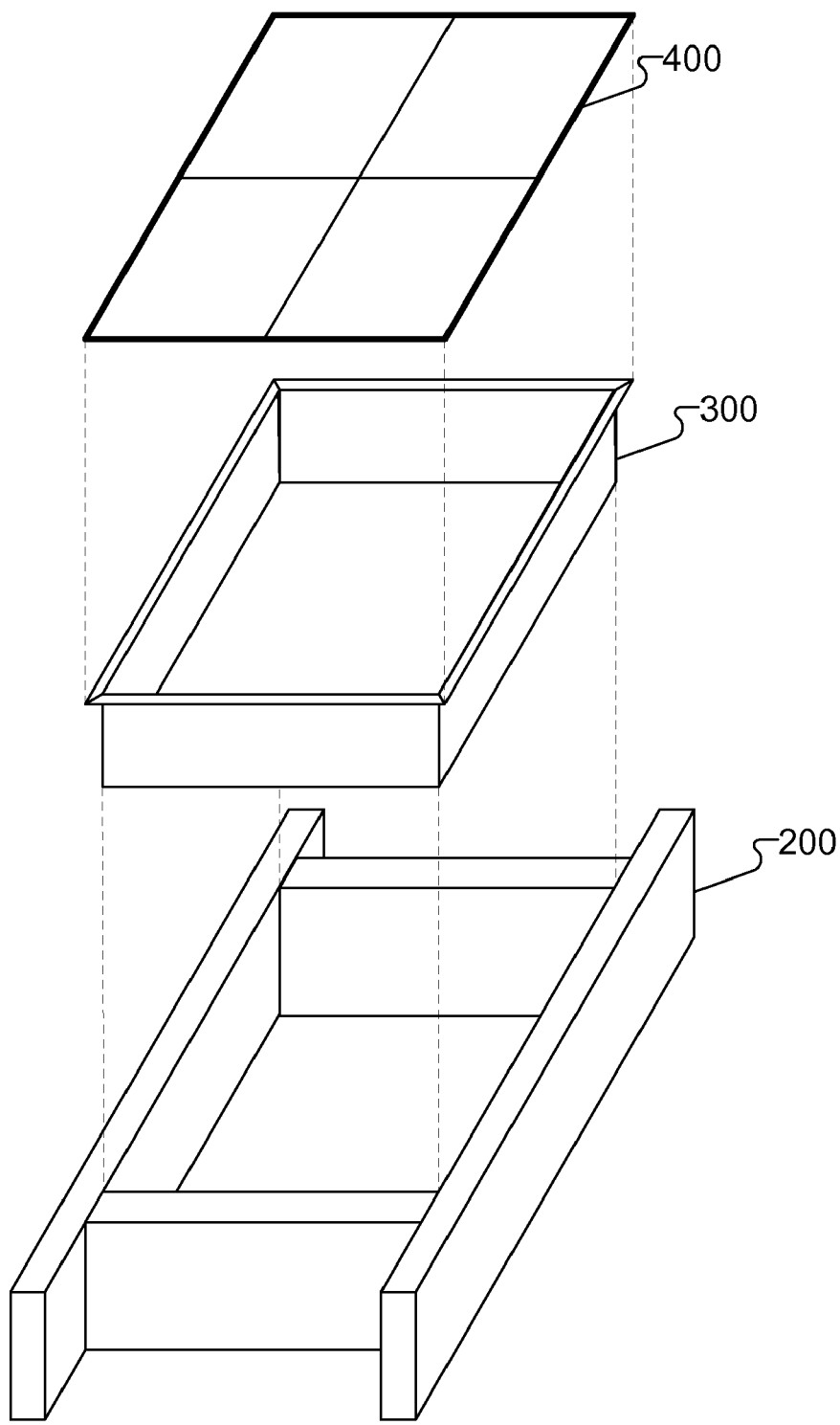
FIG. 1 shows one exemplary embodiment of the invention.

Referring now to FIG. 1, there is shown generally at reference numeral 100 an under-floor storage unit. The under-floor storage unit 100 includes a storage compartment 300 and a compartment lid 400. Shown also in the figure are under-floor support members 200.

Under-floor support members 200 may be wooden beams, joists, or the like. In many types of construction, such support members are typically provided running along only one direction. This arrangement is sufficient to implement the invention in its various embodiments, but providing support members in two orthogonal directions can advantageously provide stability and support beyond that afforded by support members running in only one direction. For the sake of simplicity and ease of understanding, the under-floor support members 200 are always shown as having members in two orthogonal directions.

The storage compartment 300 may advantageously be made of lightweight plastic, but the materials used may be selected based on sound engineering principles to suit the particulars of any situation. For example, if the storage compartment 300 will have to support weight, then a person familiar with this field will be able to select a suitable material with an appropriate thickness.

The compartment lid 400 looks like a tile floor on the top, or several floor tiles, but conceals the storage compartment 300. The floor tile on top of compartment lid 400 is at the same level as any other tiles of the floor into which it is installed. Also, the vertical and horizontal lines of the tiles should be in substantial harmony with the vertical and horizontal lines of the remainder of the tile floor so that the existence of the under-floor storage is somewhat obscured.

Figure 2:
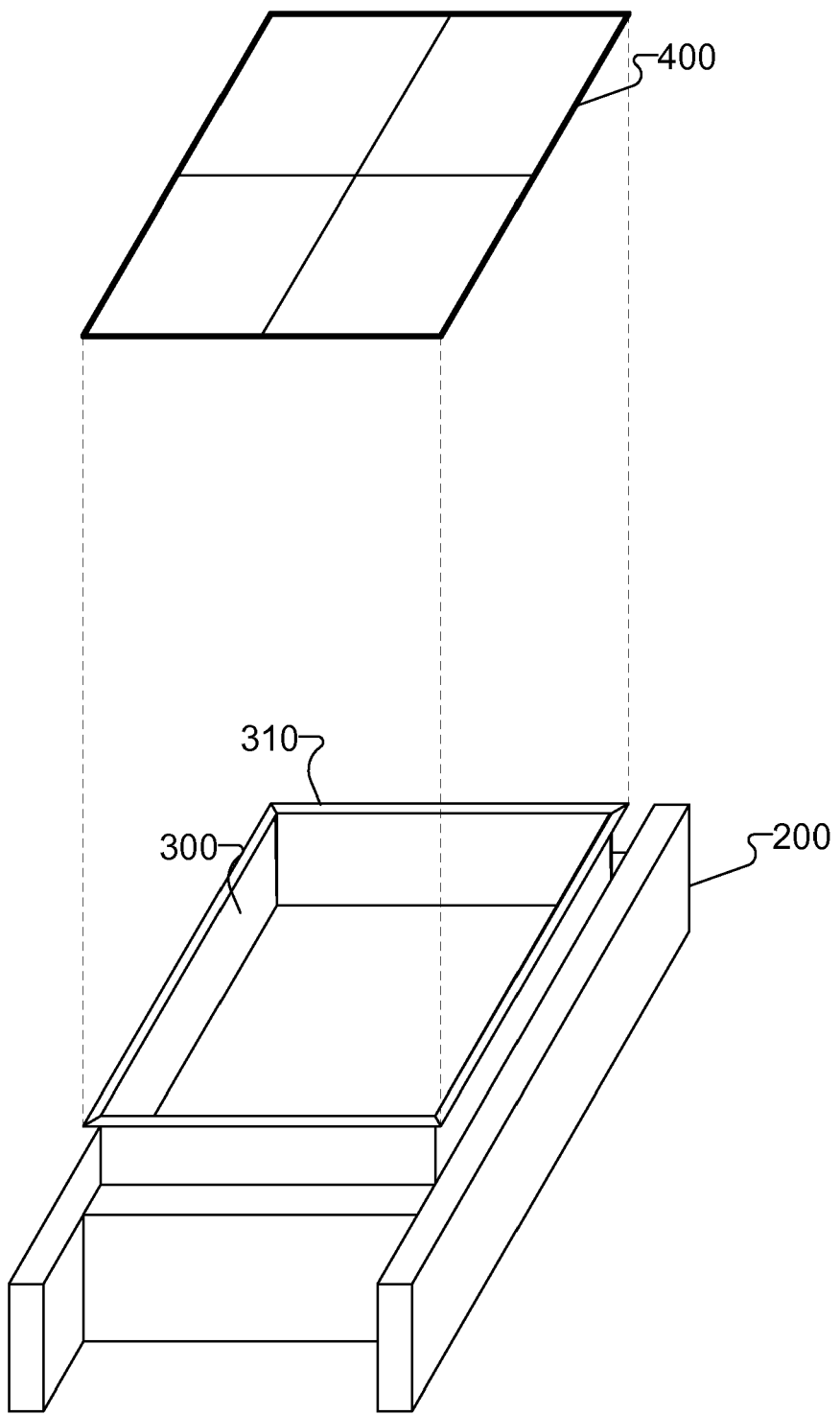
FIG. 2 shows another view of the exemplary embodiment of the invention.

Turning now to FIG. 2, there is shown one example of how a storage compartment 300 can be inserted over the under-floor support members 200. The storage compartment 300 is provided with a lip 310 that rests above the under-floor support members 200 and keeps the storage compartment 300 from falling through between the under-floor support members 200.

Figure 3:
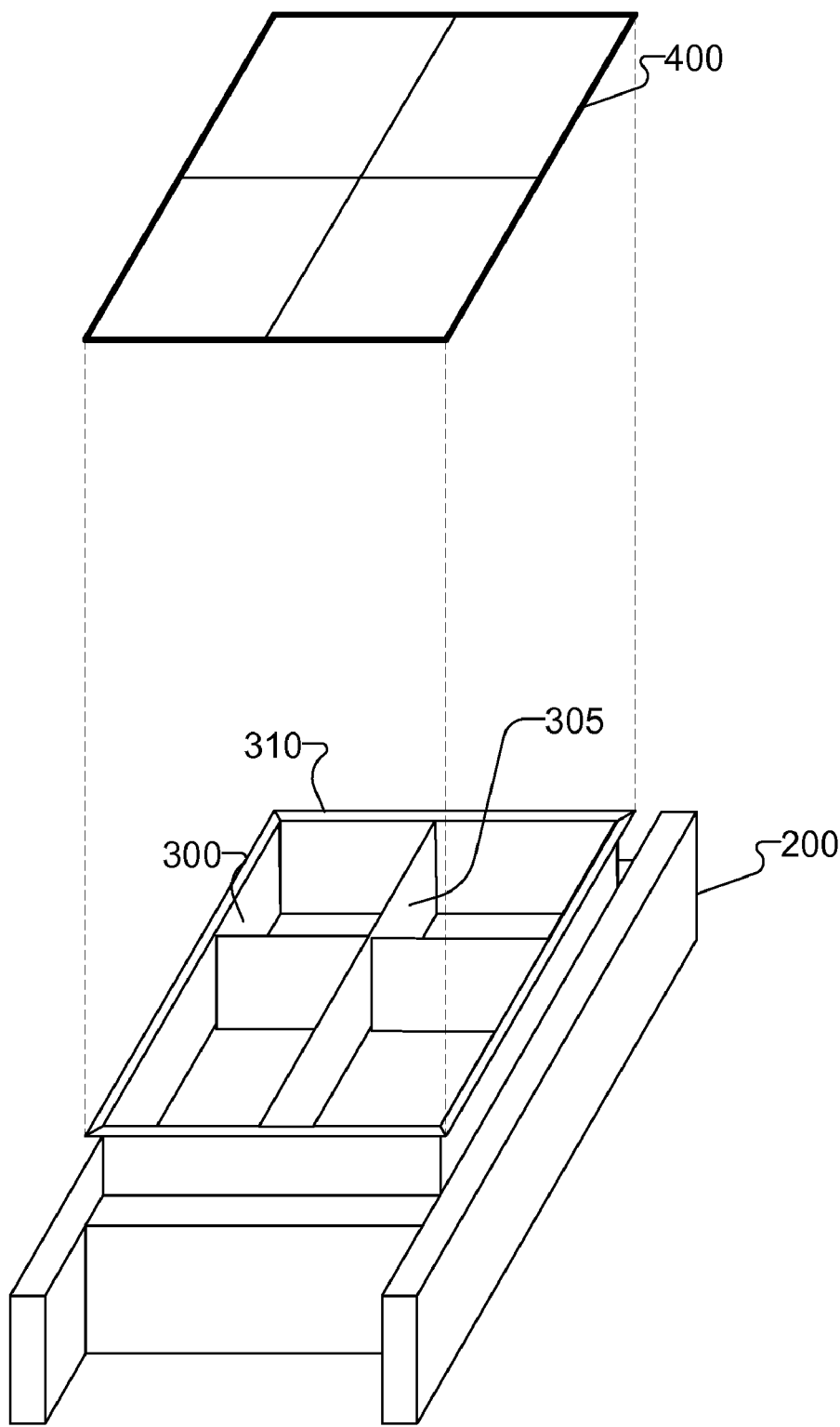
FIG. 3 shows a particular embodiment of the invention providing for multiple compartments.

FIG. 3 shows an embodiment of the invention in which storage compartment 300 is a subdivided storage compartment. The subdivided storage compartment 300 is provided with one or more dividers 305. In one embodiment, the dividers 305 are integral with the storage compartment 300, but it is also foreseen that dividers 305 can be added to the storage compartment 300 as an optional feature.

Figure 4:
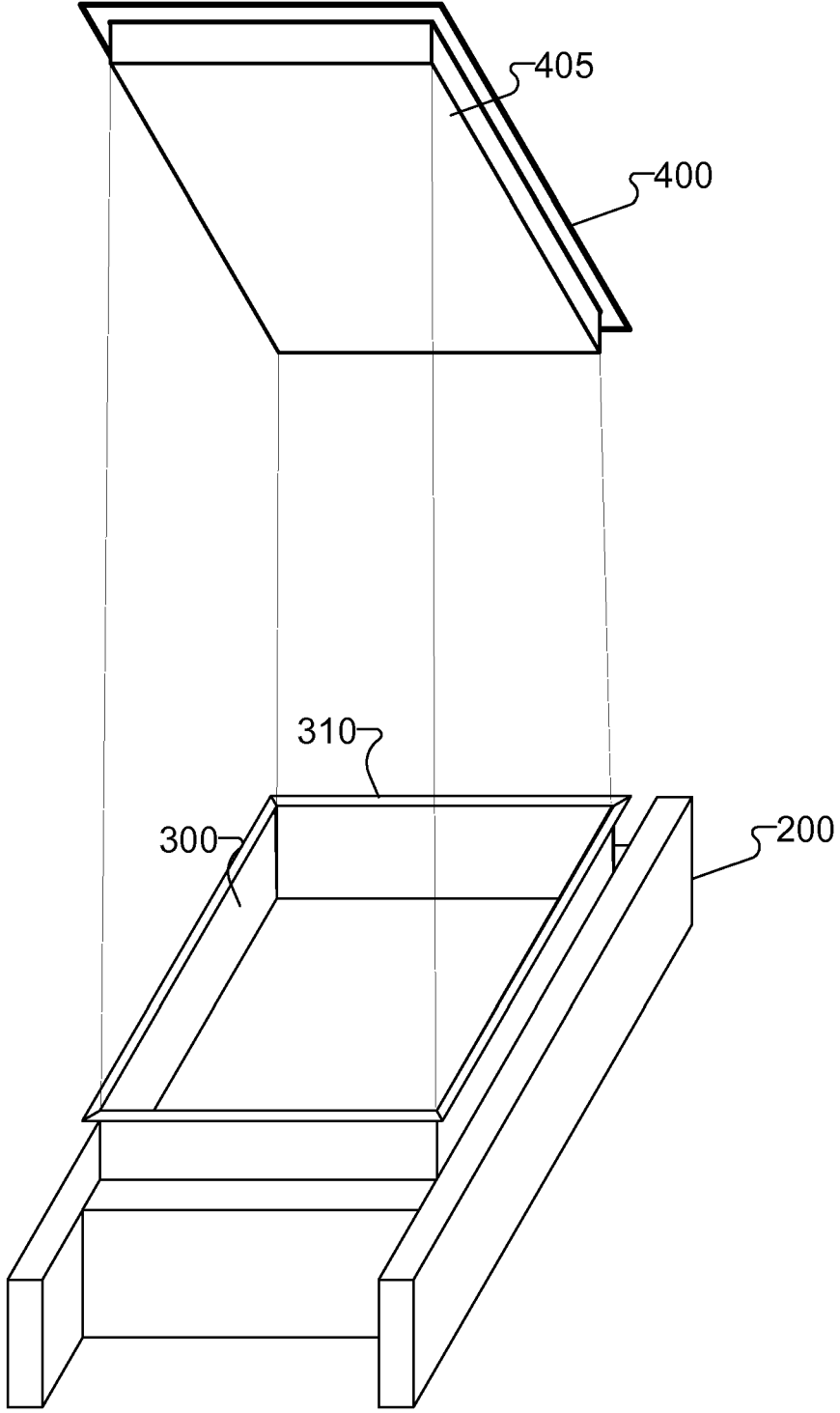
FIG. 4 shows another view of an exemplary embodiment of the invention, in which view an underside of a tile is shown.

In the embodiment shown in FIG. 4, there is shown an underside of the compartment lid 400. In this embodiment, the underside of the compartment lid 400 has an engaging protrusion 405 that snugly engages the interior of storage compartment 300. In this embodiment, the compartment lid 400 is not attached to storage compartment 300, but is held in place by the snug fitting of the engaging protrusion 405 with the interior of storage compartment 300.

In such an embodiment, some manner of removing the compartment lid 400 is necessary. One approach, not shown, is to provide a recess in the top of the compartment lid 400 wherein a finger or some lifting device may be inserted. This approach has the disadvantage of looking different from other parts of the floor that have tiles without such recesses.

Another approach to remove the compartment lid 400 in this embodiment is to use a suction device, such as a suction cup on a handle, to lift the lid. This kind of system avoids the need for a recess, but restricts the upper surface of the compartment lid 400 to a relatively smooth surface. Since the intended use for the invention, in many instances, is to provide under-floor storage units in a kitchen or bathroom, where the under-floor storage units can be concealed by being made to appear as tiles, the restriction to a smooth surface on top is not a great disadvantage.

Figure 5:
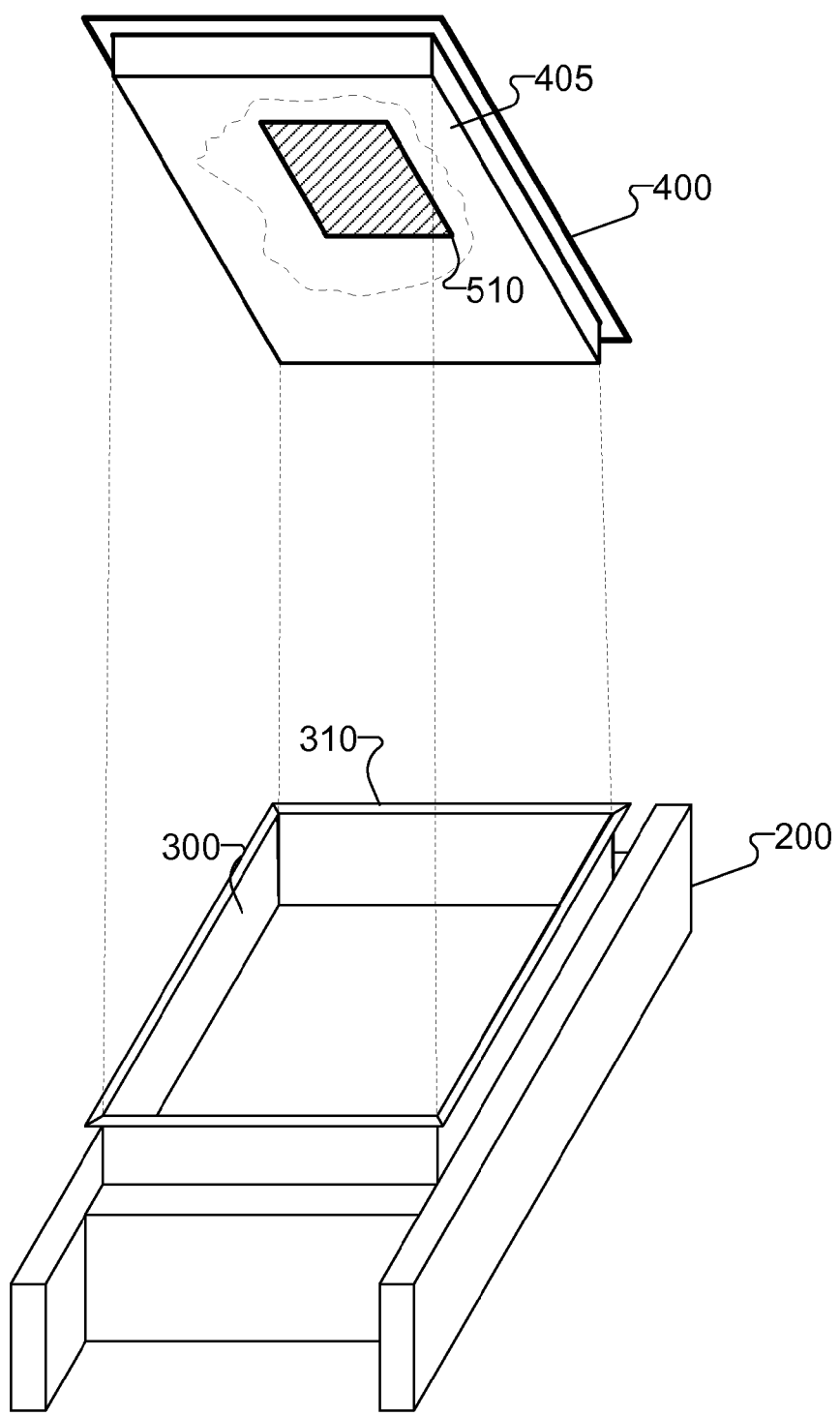
FIG. 5 shows a cutaway view of a tile lid in accordance with one embodiment of the invention.

Yet another approach to removing the compartment lid 400 is shown in FIG. 5. In FIG. 5, reference numeral 510 refers to an embedded metal plate. Embedded metal plate 510 is made of iron or any material that can be attracted by a magnet. To remove the compartment lid 400 from the storage compartment 300, the user places a magnet above the embedded metal plate 510, thereby enabling the compartment lid 400 to be lifted at least enough to permit the user to engage the edges of the compartment lid 400 with their fingers or the like.

Figure 6:
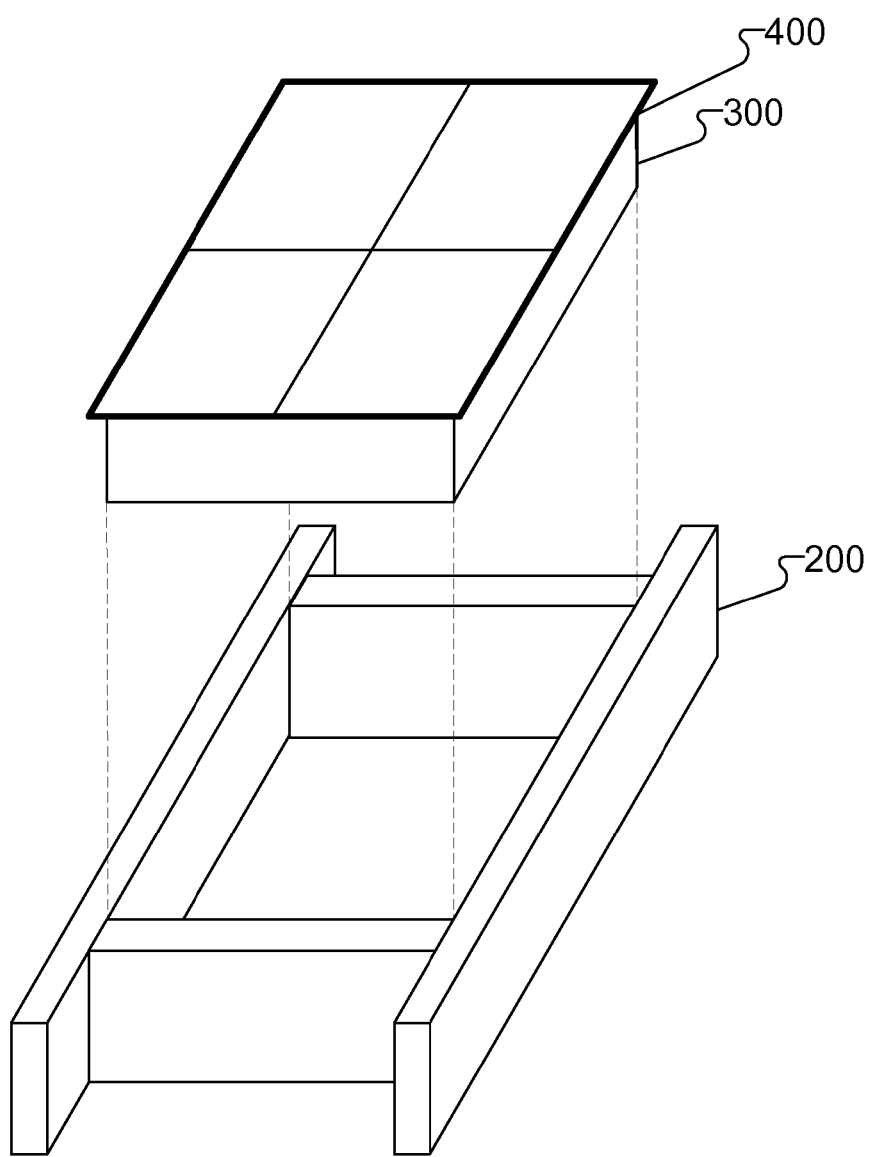
FIG. 6 shows a different embodiment of the invention in which the lid and the storage compartment form an integral unit that is separable only after being withdrawn from under a floor.

In FIG. 6, the illustrated under-floor storage unit 100 is of the preferred type in which the storage compartment 300 is attached to the compartment lid 400. The under-floor storage unit 100 according to this embodiment has the important advantage that, when lifted, the contents of storage compartment 300 do not remain below floor level. In embodiments such as that shown in FIG. 4, where the compartment lid 400 and storage compartment 300 are not attached to each other, it is necessary to stoop very low to reach the contents of storage compartment 300 after compartment lid 400 is removed. In the embodiment shown in FIG. 6, however, when the under-floor storage unit 100 is removed upward, the storage compartment 300 comes upward as well. The user can then detach the compartment lid 400 from the storage compartment 300 at a convenient working height, and likewise access the contents of storage compartment 300 without any further stooping.

In FIG. 6, although it is not shown, the lip 310 of storage compartment 300 is of the type that rests on under-floor support members 200.

Figure 7:
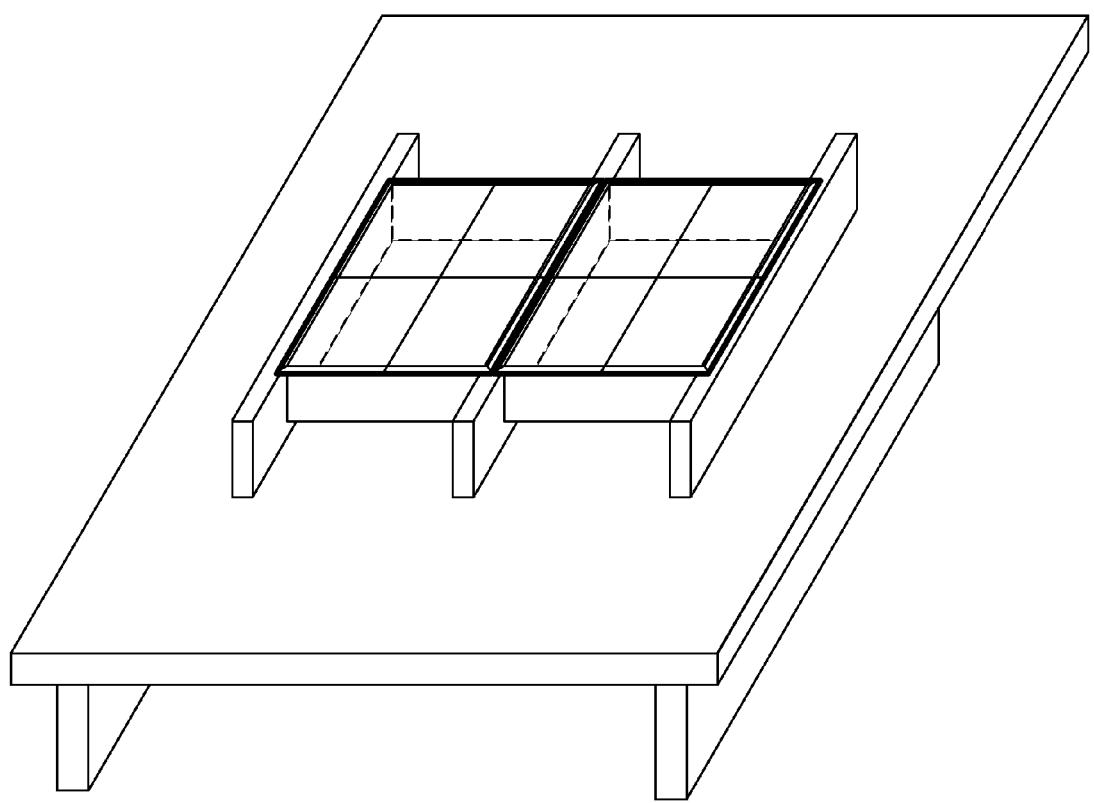
FIG. 7 shows an example of an installation above a pre-existing floor.

FIG. 7 illustrates the manner in which under-floor storage unit 100 can be used in a kind of installation built upon an already existing floor. This type of installation might be appropriate where it would not look unusual to have a floor that is a step-up from other rooms. Another situation in which this type of installation might be appropriate is when under-floor storage unit 100 is desired in a room that has a concrete floor such as a basement or the like.

Figure 8:
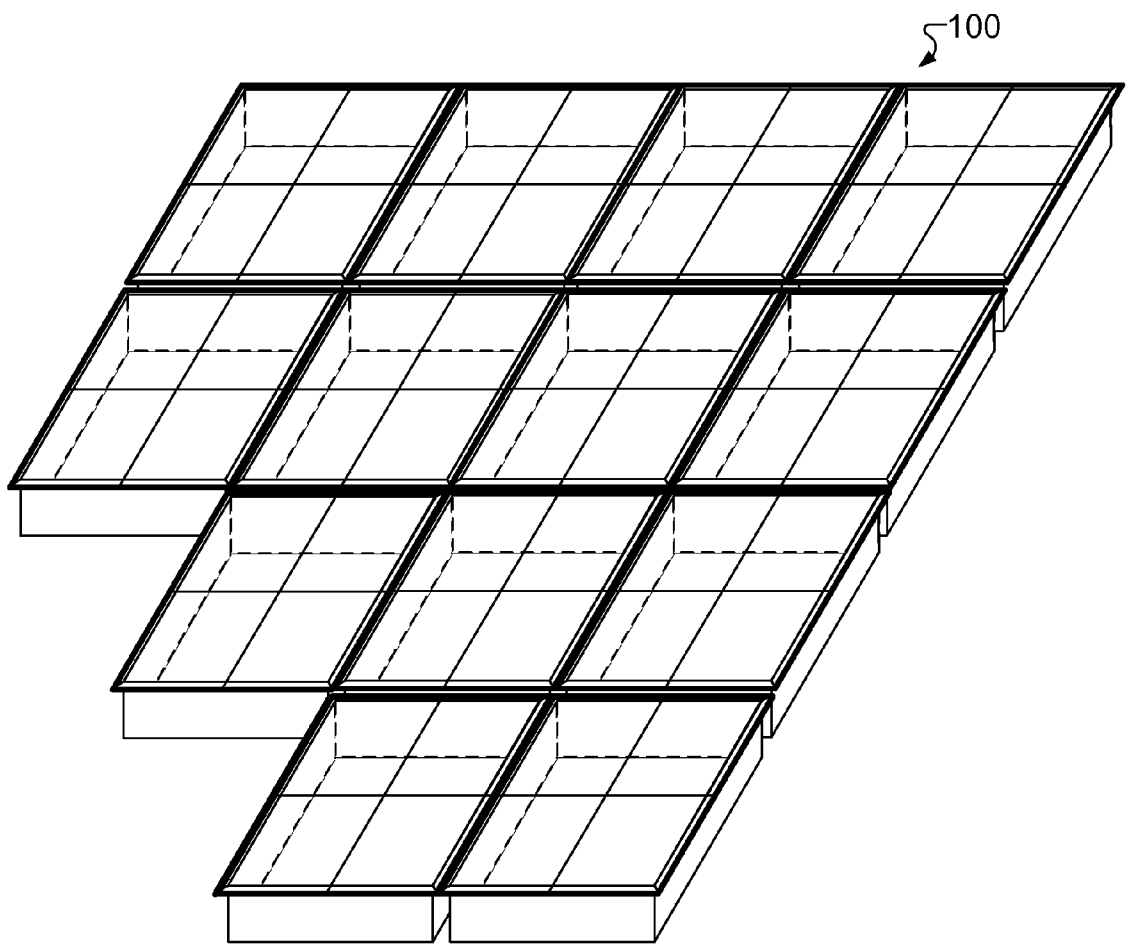
FIG. 8 shows an example of an installation of multiple sub-floor storage units.

FIG. 8 shows the use of under-floor storage unit 100 in an installation that provides for maximum storage. Substantially every possible place where an under-floor storage unit 100 can be inserted is used.

Figure 9:
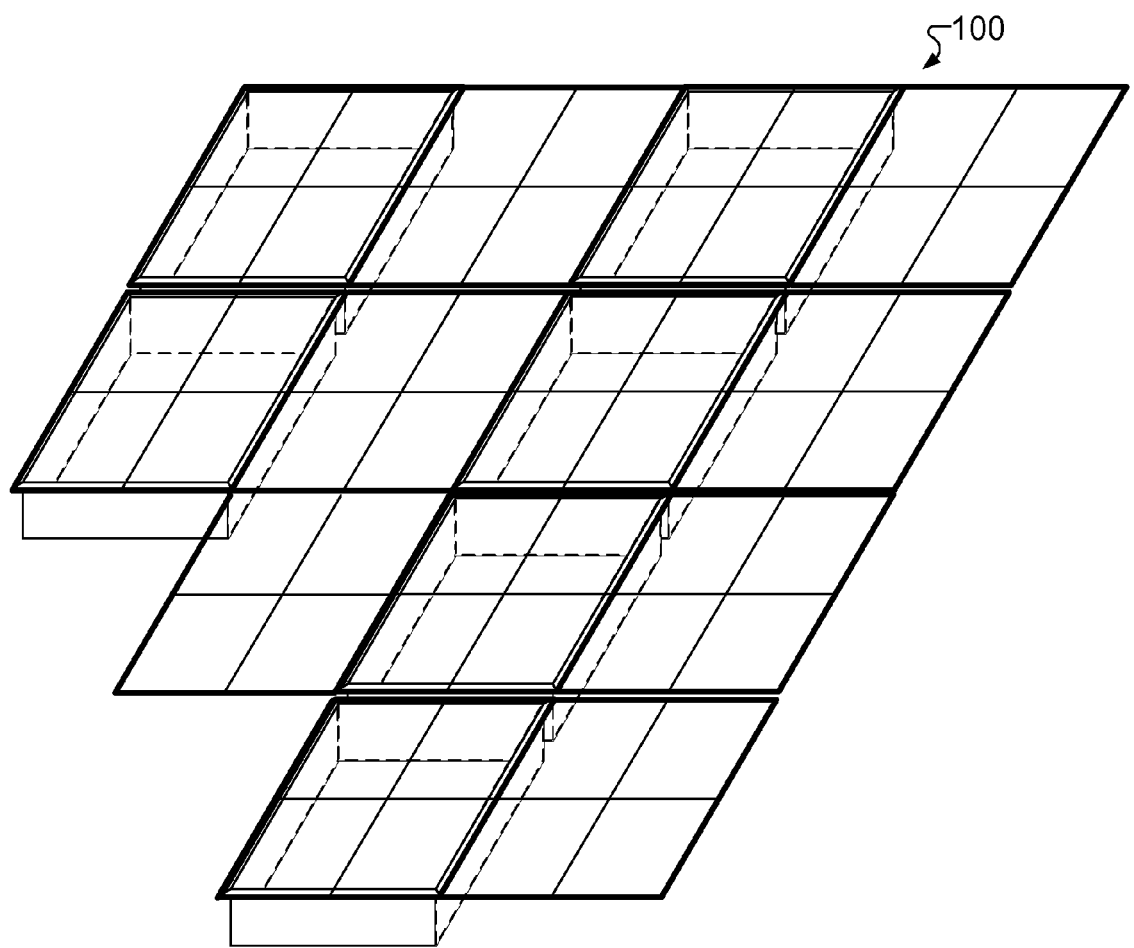
FIG. 9 shows an alternative example of an installation of multiple sub-floor storage units.

FIG. 9 shows that it is possible to use a combination of normal flooring and under-floor storage units 100.

Figure 10:
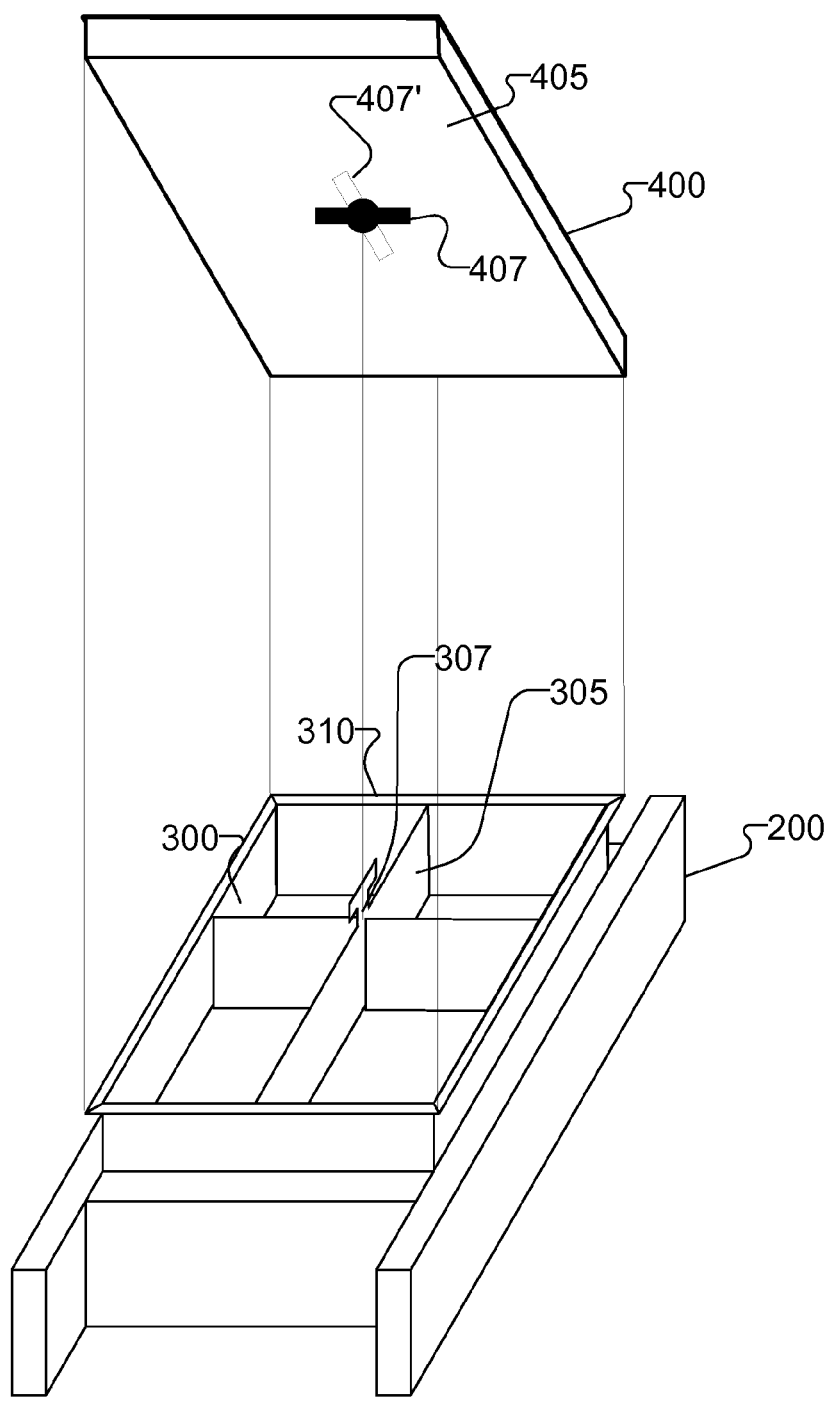
FIG. 10 shows one view of an exemplary embodiment of the invention having multiple compartments and a connector connecting a divider with the compartment lid.

FIG. 10 shows one manner in which storage compartment 300 may be attached to compartment lid 400. In FIG. 10, key-shaped protrusion 307 is disposed on dividers 305. Disposed in compartment lid 400 is key-accepting recess 407. The key-accepting recess 407 is adapted to receive key-shaped protrusion 307 in a manner shown in FIG. 11 (see also 407' which indicates a position of key-shaped protrusion 307 within compartment lid 400 after the key-shaped protrusion 307 is received into key-accepting recess 407).

Figure 11:
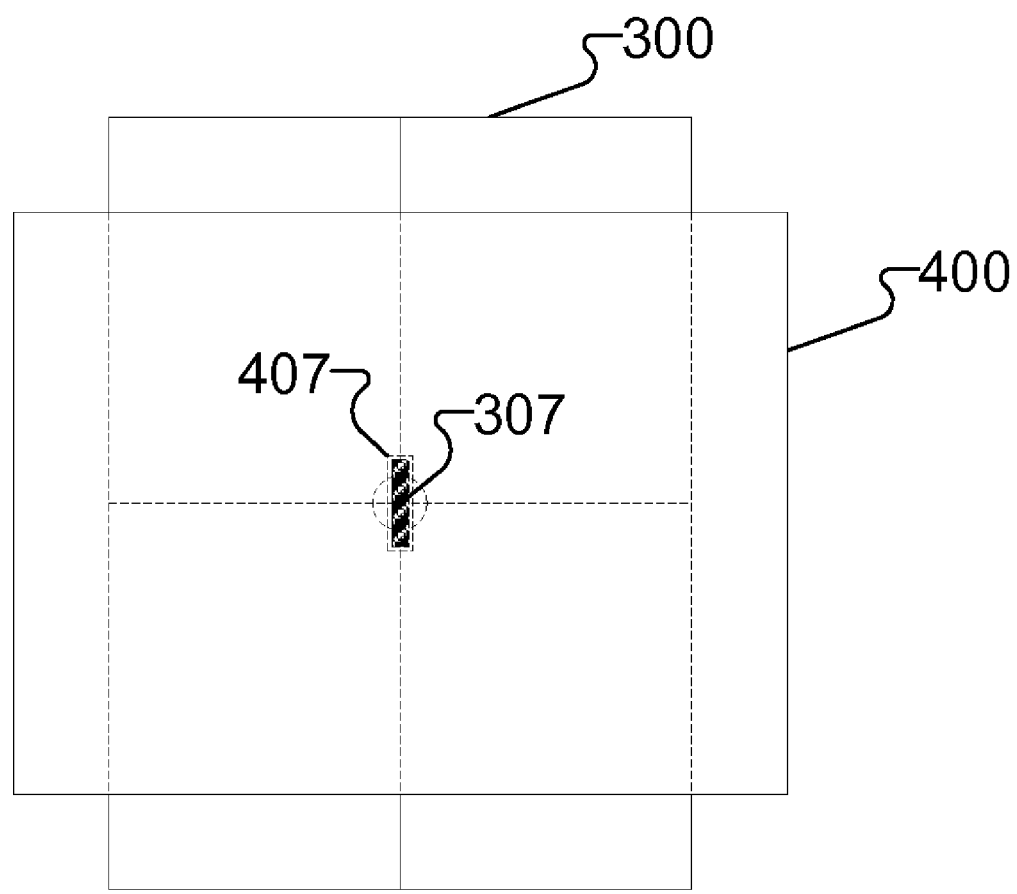
FIG. 11 is a simplified schematic showing cooperation between the connector on the divider and the lid.

To insert the key-shaped protrusion 307 into the key-accepting recess 407, the compartment lid 400 is rotated with respect to storage compartment 300, as shown in FIG. 11.

Figure 12:
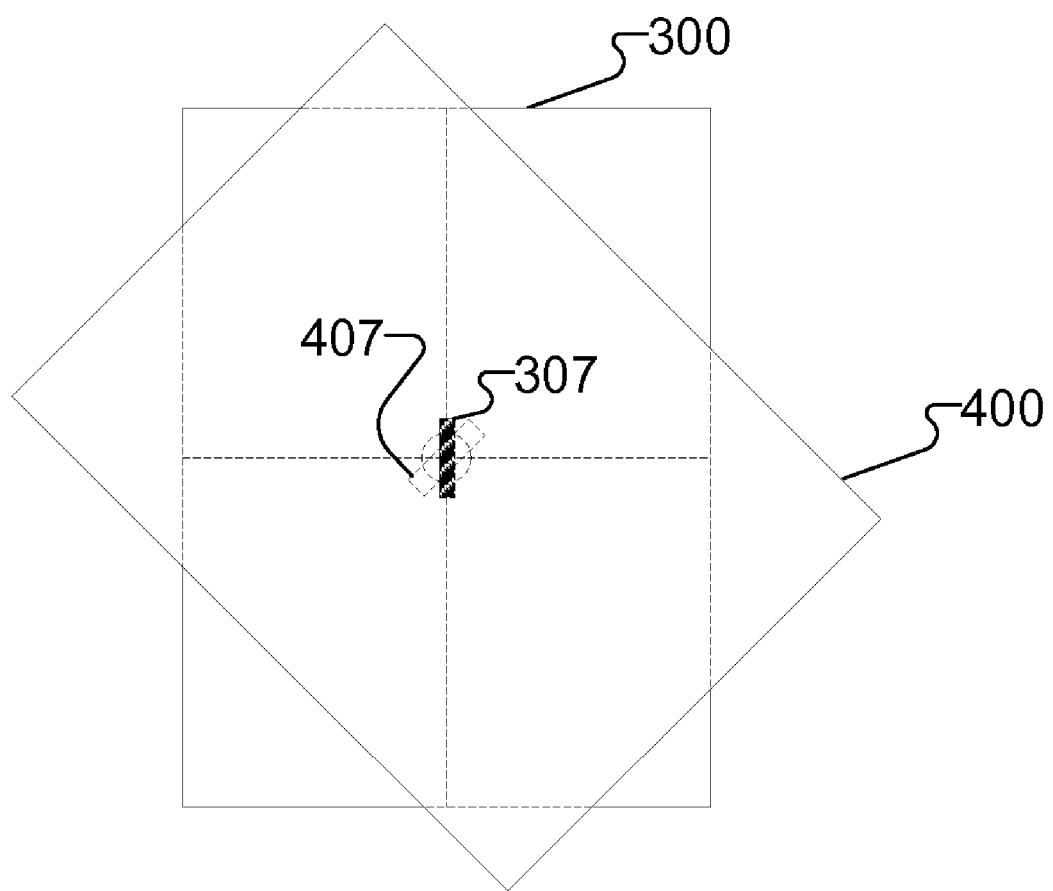
FIG. 12 is a further schematic showing cooperation between the connector on the divider and the lid.

After key-shaped protrusion 307 is fitted into key-accepting recess 407 and has been allowed to slide upward within compartment lid 400, then compartment lid 400 is rotated with respect to storage compartment 300. Certain projecting portions of key-shaped protrusion 307 thereafter prevent key-shaped protrusion 307 from exiting key-accepting recess 407, as shown in FIG. 12.

Figure 13:
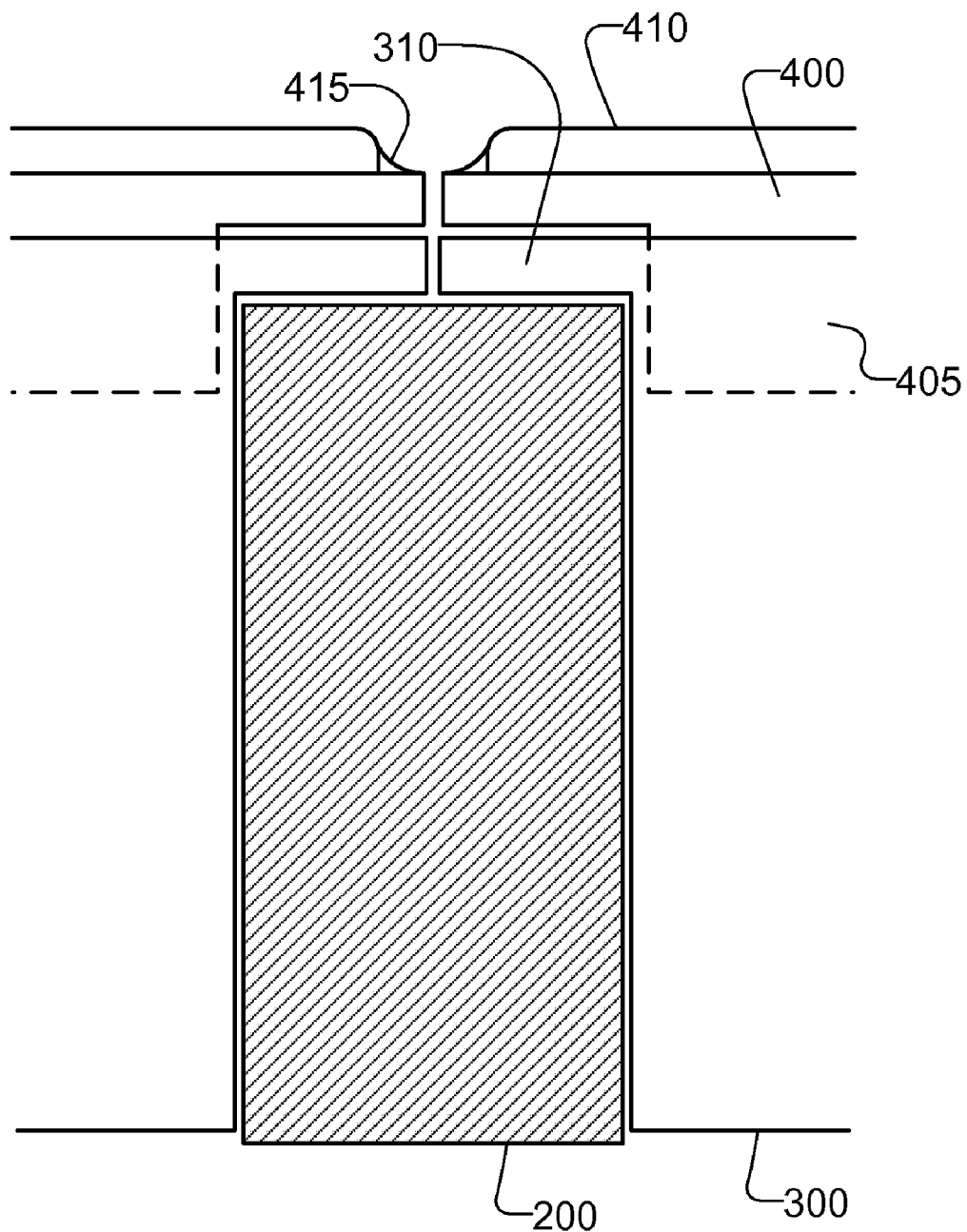
FIG. 13 is a cross-sectional drawing showing how an embodiment is arranged for installation.

Turning now to FIG. 13, there is shown an embodiment of the invention in cross section. This embodiment is similar to that of FIG. 4, in which the compartment lid 400 is not attached to the storage compartment 300. In FIG. 13, compartment lid 400 has a floor tile 410 and some real or simulated grout 415. The lip 310 is shown resting directly upon under-floor support members 200.

Figure 14:
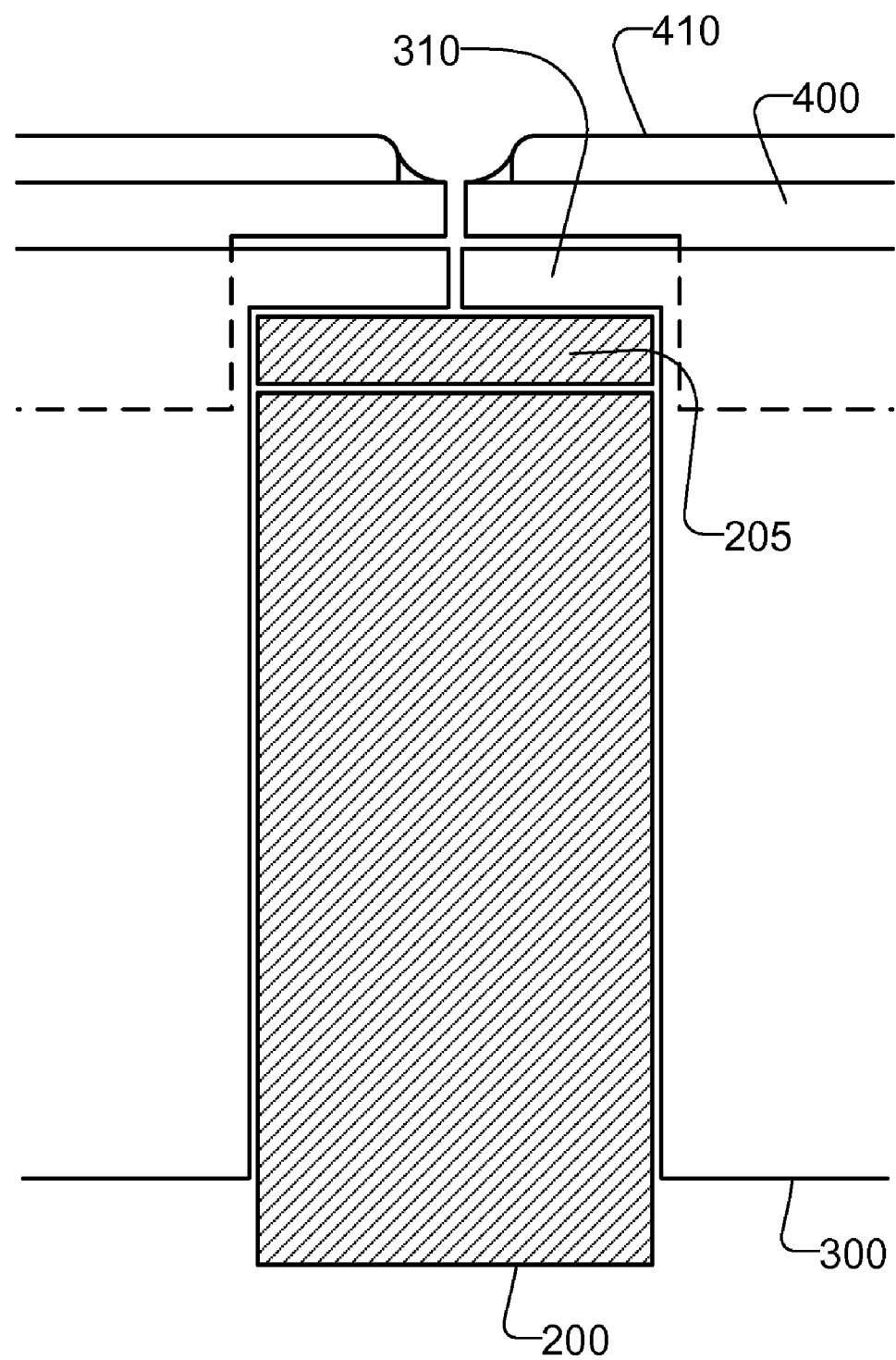
FIG. 14 is another cross-sectional drawing showing an alternative arrangement for installation.

FIG. 14 is similar to FIG. 13, except for the presence of under-floor leveling member 205. The purpose of under-floor leveling member 205 is to raise the height of the top of floor tile 410 so that it is at the same height of other tiles that are not mounted on under-floor storage units. This might be frequently necessary in the case in which existing floors are retrofitted with under-floor storage units. The under-floor leveling member 205 may, for example, be the same height as a subfloor layer.

Figure 15:
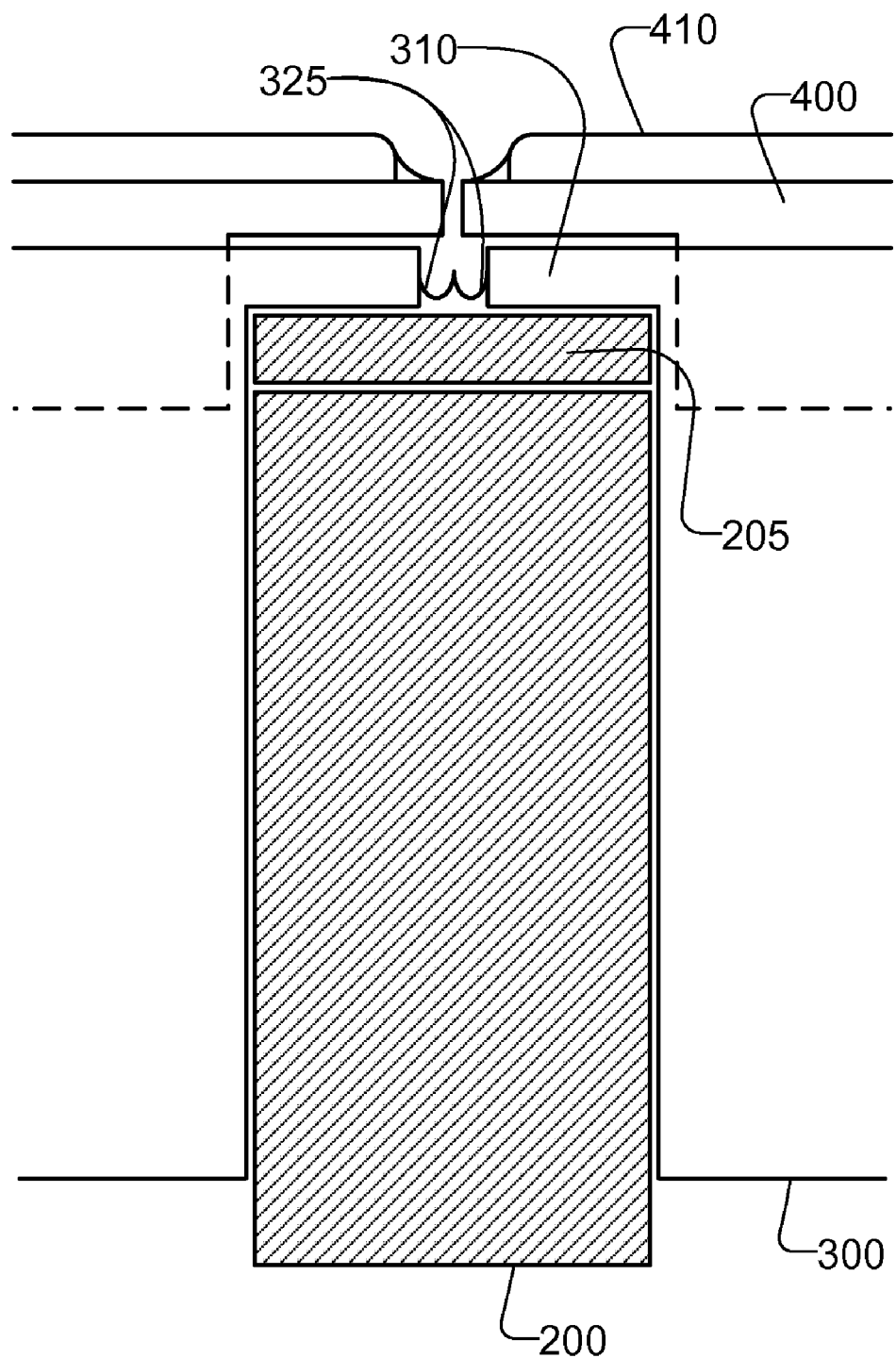
FIG. 15 shows an approach to avoiding problems with liquids.

In embodiments described above, the lip 310 extended away from storage compartment 300 to a point that was coextensive with the end of compartment lid 400. In FIG. 15, an embodiment is shown in which the lip 310 extends away from storage compartment 300 but not as far as the end of compartment lid 400. In the space that is between adjacent instances of lip 310, there are provided troughs 325 for catching liquid. The purpose of troughs 325 is to catch any liquid that might slip down through gaps that are around storage units. In FIG. 15, the troughs 325 are shown in an arrangement in which adjacent troughs abut and push against each other.

Figure 16:
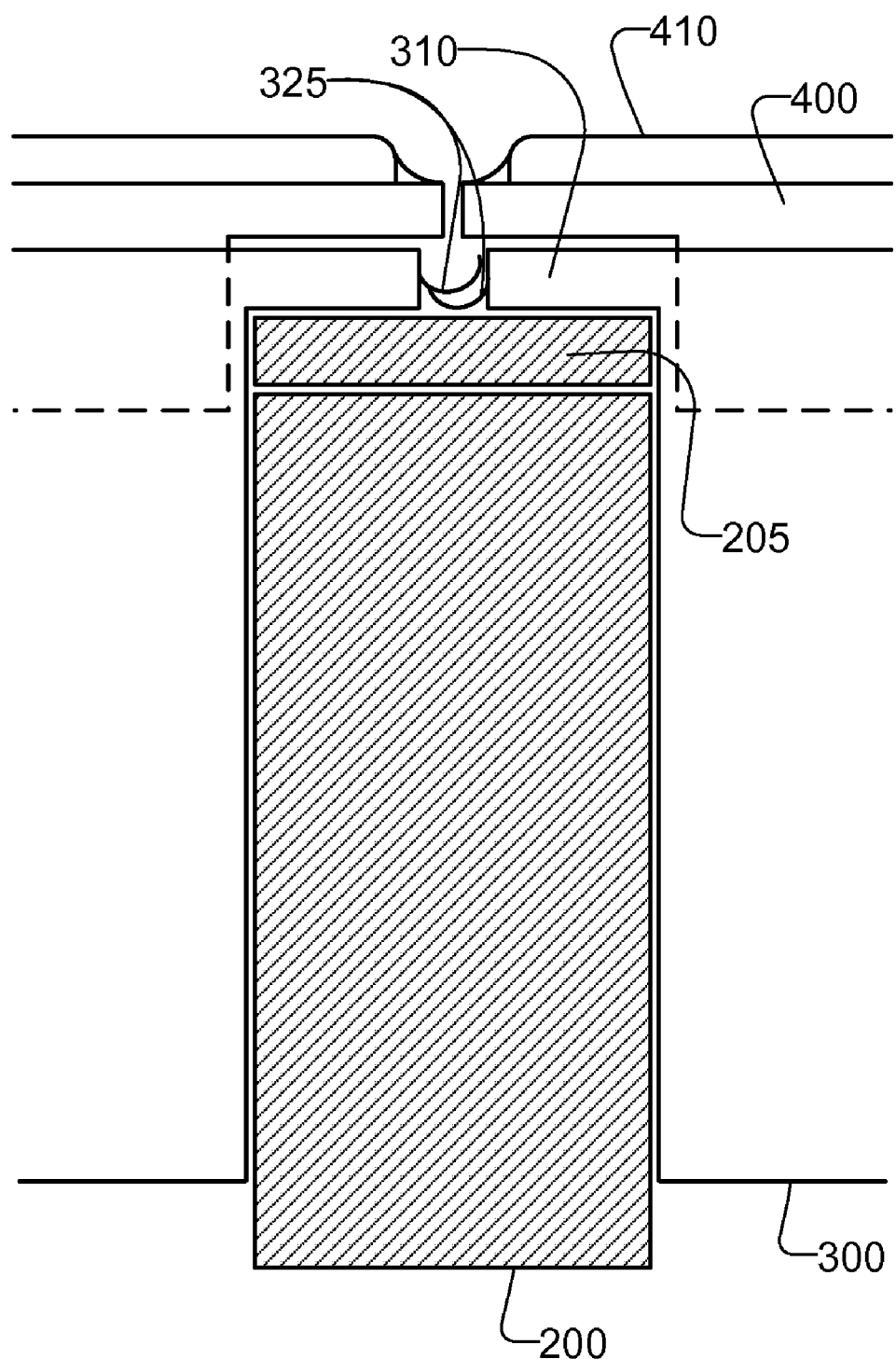
FIG. 16 shows an alternative approach to avoiding problems with liquids.

In FIG. 16, the troughs 325 are shown in an arrangement in which adjacent troughs overlap, providing improved opportunities for catching liquid. According to this embodiment, the troughs have an overall width that extends beyond the end of the compartment lid 400. Thus, in FIG. 16, the troughs extend furthest from the storage compartment 300, the end of the compartment lid 400 is next furthest, and the lip 310 extends the least from the storage compartment 300.

Figure 17:
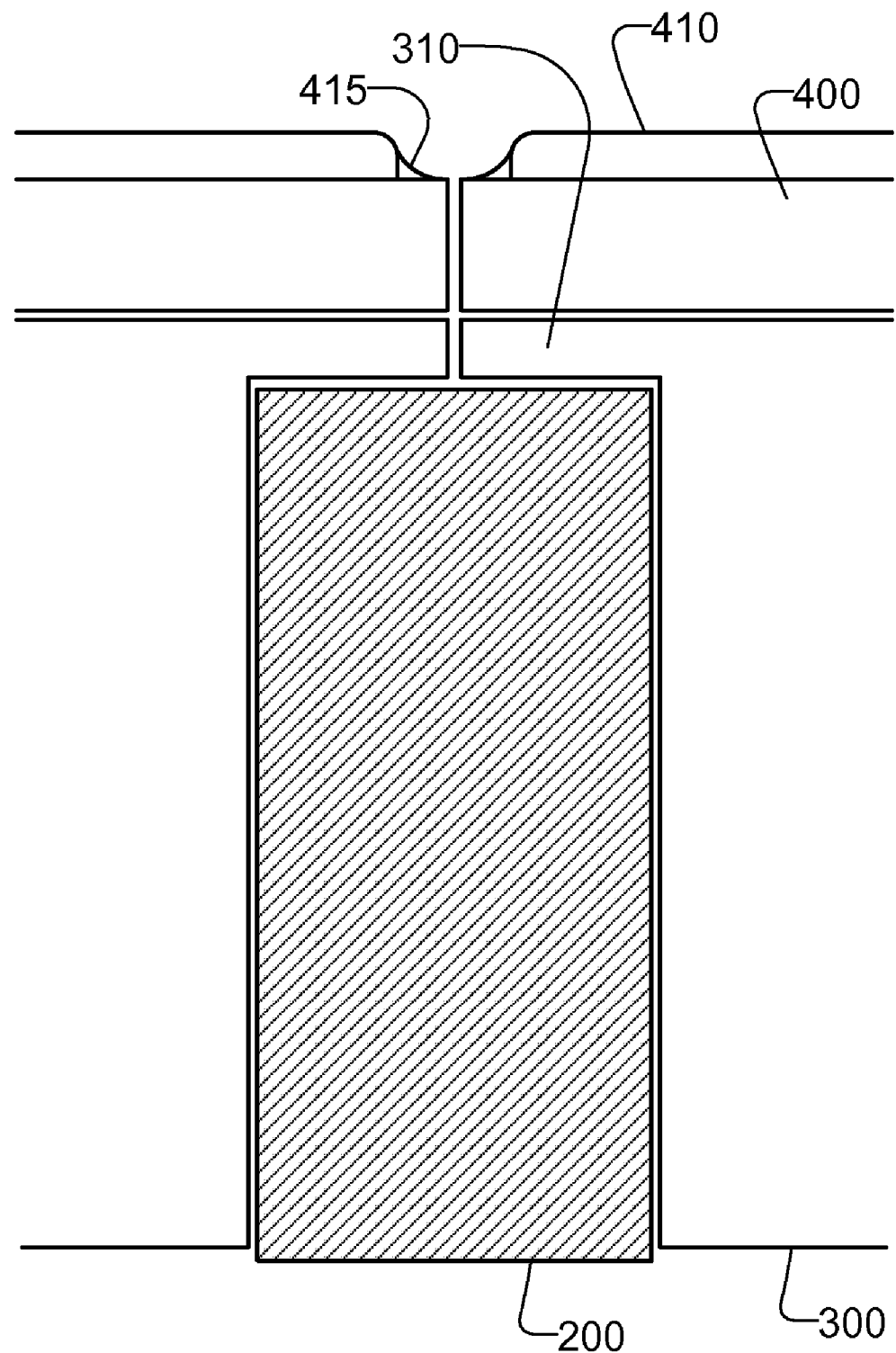
FIG. 17 is a cross-sectional drawing showing yet another alternative arrangement for installation.

In the embodiment shown in FIG. 17, the under-floor leveling member 205 is rendered unnecessary because the thickness of compartment lid 400 is set so as to take into account the thickness of a subfloor layer.

Figure 18:
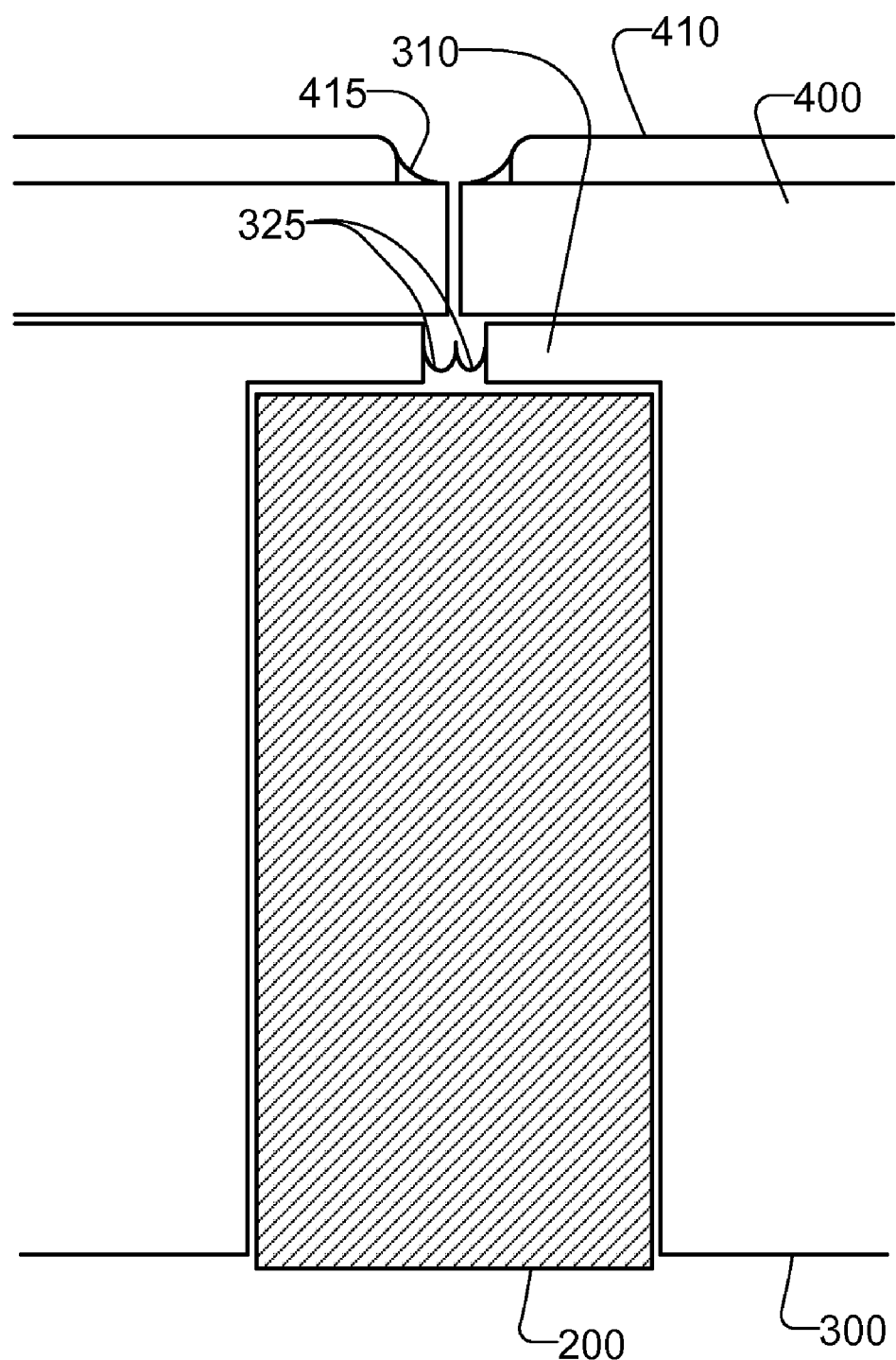
FIG. 18 shows an approach to avoiding problems with liquids in the yet another alternative arrangement.

FIG. 18 is similar to FIG. 17, but shows the use of troughs 325.

Figure 19:
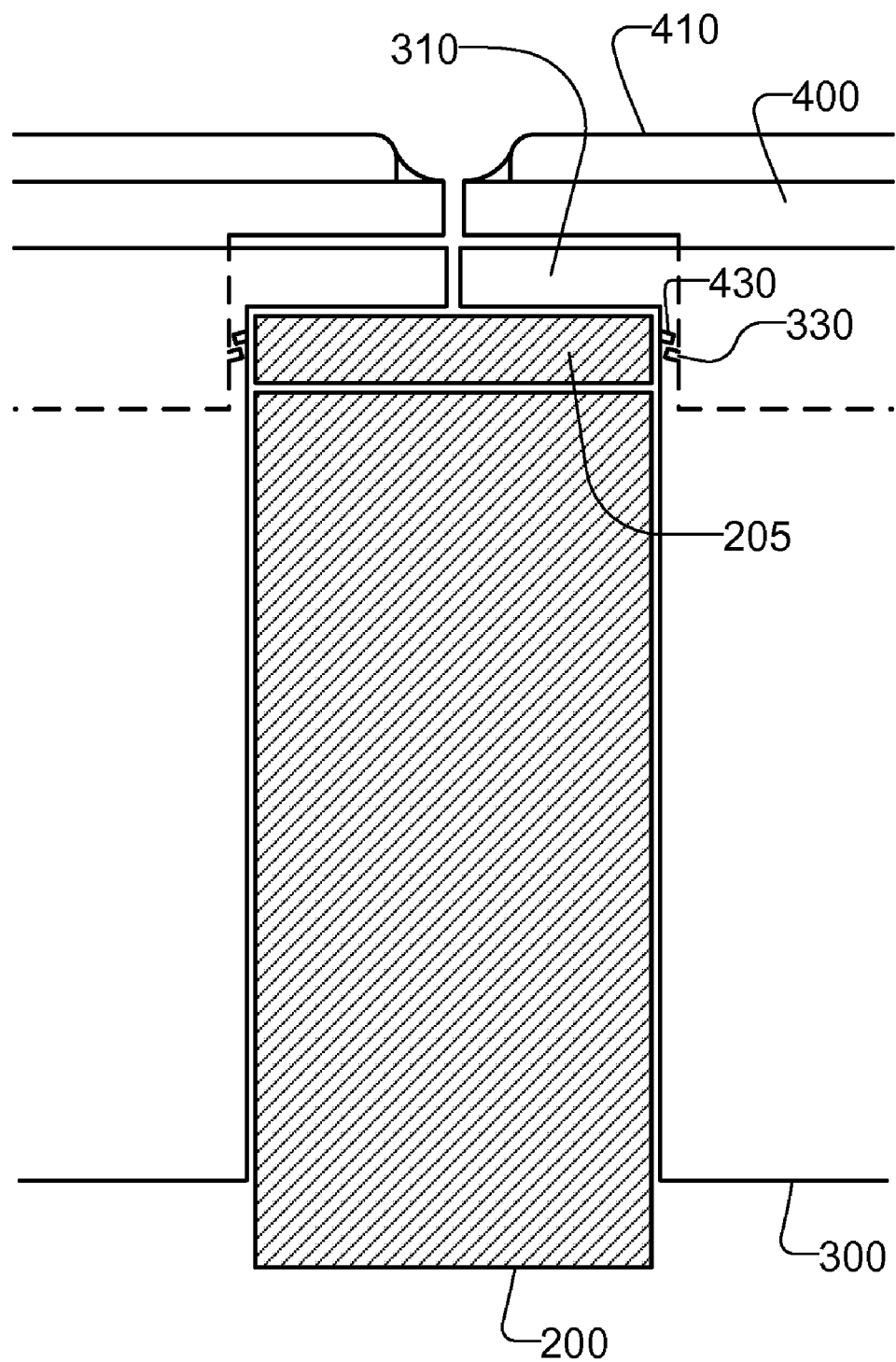
FIG. 19 shows one manner in which a compartment lid can engage a compartment.

FIG. 19 shows one simple manner in which compartment lid 400 may be attached to storage compartment 300 by way of ridges 330 and 430 which are made of flexible but resilient plastic, in the manner of popular plastic food containers.

Figure 20:
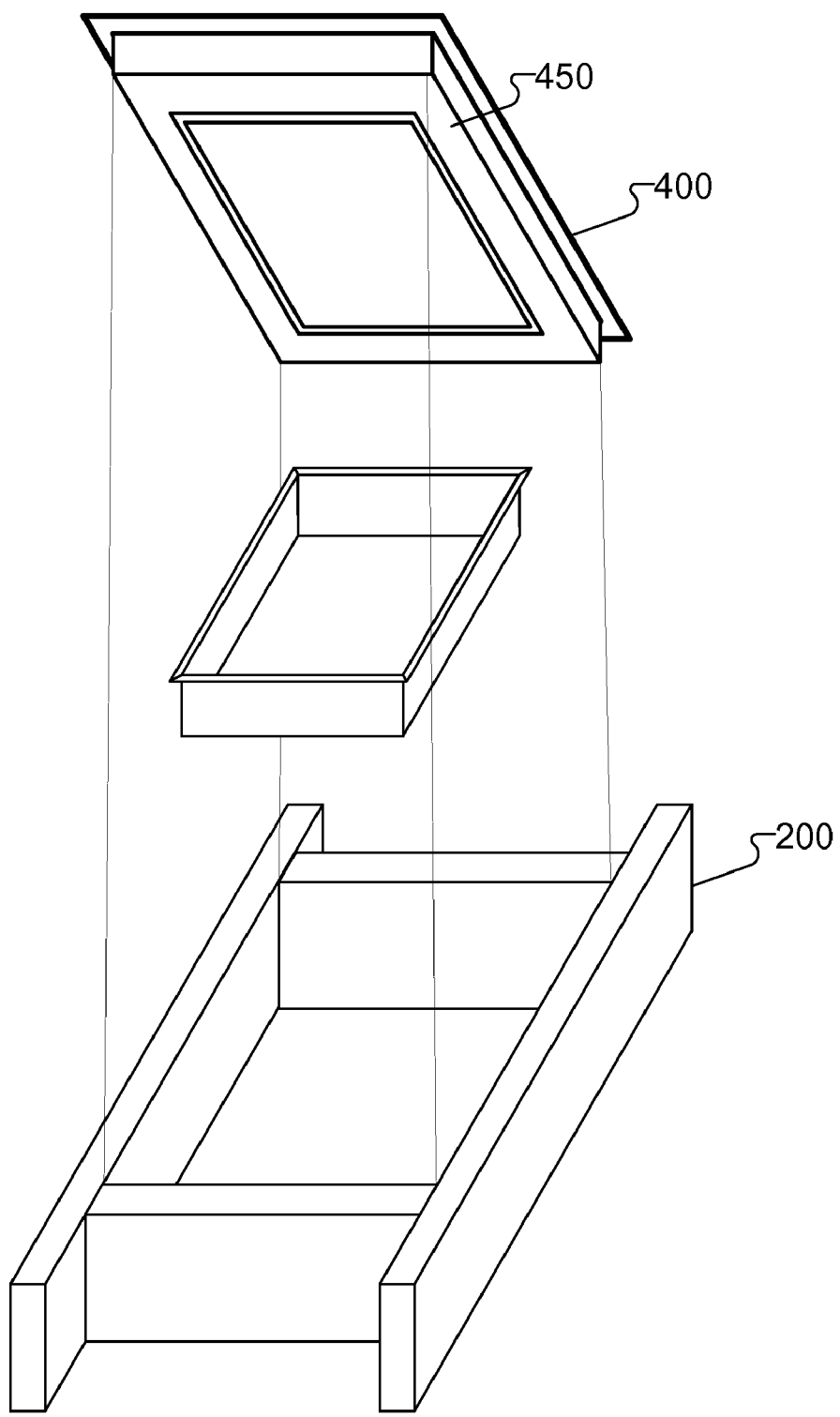
FIG. 20 shows an embodiment in which the compartment lid engages an under floor support member but the compartment does not.

The embodiments above are all based on the idea that the storage compartment 300 should be as large as possible and therefore lip 310 was provided so that the lip 310 could rest on the under-floor support members 200 or under-floor leveling member 205. In FIG. 20, however, the storage compartment 300 is smaller than the compartment lid 400, and therefore the lip of storage compartment 300 will not reach under-floor support members 200. In FIG. 20 the underside 450 of compartment lid 400 rests upon under-floor support members 200 or under-floor leveling member 205. It is also possible to have floor tile 410 rest upon under-floor support members 200 or under-floor leveling member 205.

The storage compartment 300 thus is attached to underside 450 of compartment lid 400.

Figure 21:
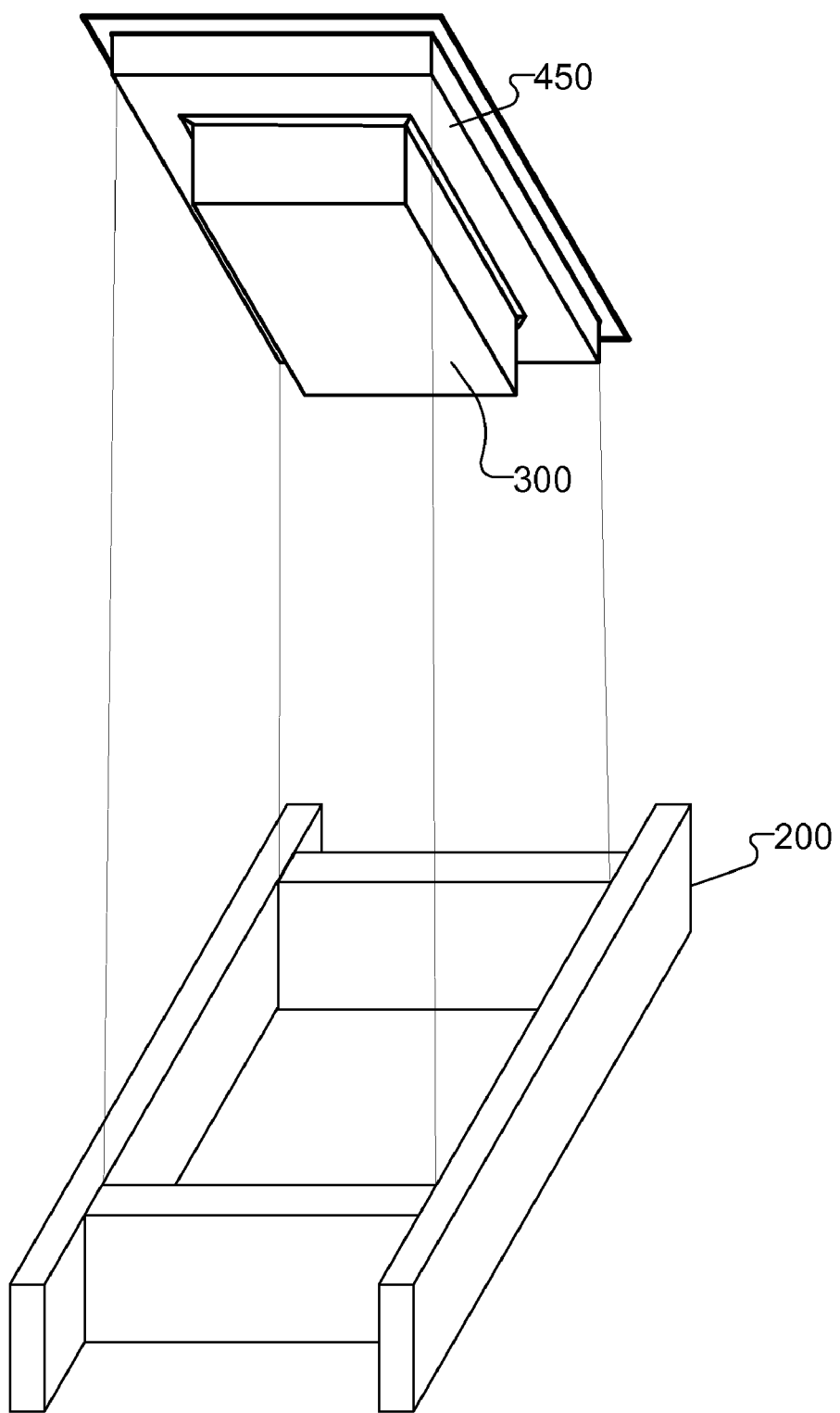
FIG. 21 shows the embodiment as in FIG. 20, but with the compartment and its lid engaged.

FIG. 21 shows the embodiment of FIG. 20, but with storage compartment 300 attached to underside 450 of compartment lid 400. The storage compartment 300 may be so attached in several ways, including by use of the key-shaped protrusion 307 and key-accepting recess 407.

Many variations to the above-identified embodiments are possible without departing from the scope and spirit of the invention. Possible variations have been presented throughout the foregoing discussion.

Combinations and subcombinations of the various embodiments described above will occur to those familiar with this field, without departing from the scope and spirit of the invention.

The invention claimed is:

1. A tile floor that has an under-floor storage unit, intended for use in a bathroom or kitchen of a residence, comprising:
   a tile floor supported by one or more under-floor support members;
   an under-floor storage unit with a storage compartment and a compartment lid, supported by one or more of the under-floor support members; wherein:
      the compartment lid includes one or more floor tiles on top;
      the under-floor storage unit has a lip resting above an under-floor support member, and has, at an outer periphery of the lip, a trough for catching liquids;
      the storage compartment has walls and a floor; and
      the one or more floor tiles on top of the compartment lid are at a level of other tiles of the tile floor;
   whereby the under-floor storage unit provides for storage of items, below the level of the tiles of the tile floor, in the storage compartment.

2. The tile floor as set forth in claim 1, wherein, in the under-floor storage unit, the storage compartment and the compartment lid are attached to each other when the under-floor storage unit is positioned in the floor.

3. The tile floor as set forth in claim 1, wherein the underside of the compartment lid has an engaging protrusion that snugly engages the interior of the storage compartment.

4. The tile floor as set forth in claim 1, wherein: the compartment lid has an embedded metal plate, and the metal plate is made of material that can be attracted by a magnet.

5. The tile floor as set forth in claim 1, wherein the compartment lid includes a recess adapted to permit raising of the compartment lid.

6. The tile floor as set forth in claim 1, wherein the under-floor support members are wooden joists.

* * * * *